United States Patent [19]
van den Berg

[11] Patent Number: 5,918,566
[45] Date of Patent: Jul. 6, 1999

[54] METHOD OF POSITIONING MEANS FOR AUTOMATICALLY MILKING ANIMALS, SUCH AS COWS, AS WELL AS AN IMPLEMENT FOR APPLYING SAME

[75] Inventor: Karel van den Berg, Bleskensgraaf, Netherlands

[73] Assignee: Maasland N. V. a Dutch limited liability, Maasland, Netherlands

[21] Appl. No.: 08/626,490

[22] Filed: Apr. 3, 1996

[30] Foreign Application Priority Data

Apr. 3, 1995 [NL] Netherlands ............................ 1000010

[51] Int. Cl.⁶ ...................................................... A01J 3/00
[52] U.S. Cl. ...................................... 119/14.02; 119/14.08
[58] Field of Search ................................. 119/14.1, 14.02, 119/14.03, 14.08, 14.07, 14.01

[56] References Cited

U.S. PATENT DOCUMENTS

| 5,020,477 | 6/1991 | Dessing et al. | 119/14.08 |
| 5,042,428 | 8/1991 | Van der Lely et al. | 119/14.08 |

FOREIGN PATENT DOCUMENTS

| 0306579 | 3/1989 | European Pat. Off. |
| 0440313 | 8/1991 | European Pat. Off. |
| 0 519 544 A1 | 12/1992 | European Pat. Off. |
| 0519544 | 12/1992 | European Pat. Off. |
| 0565189 | 10/1993 | European Pat. Off. |
| 0 572 068 A2 | 12/1993 | European Pat. Off. |
| 0572068 | 12/1993 | European Pat. Off. |

OTHER PUBLICATIONS

International Type Search Report for Netherlands Application No. 1000010, filed Apr. 3, 1995, which is in Dutch.

*Primary Examiner*—John G. Weiss
*Assistant Examiner*—David J. Cho
*Attorney, Agent, or Firm*—Penrose Lucas Albright

[57] ABSTRACT

In a method of positioning means for automatically milking animals, such as cows, there is used a robot construction. The means for automatically milking are positioned, by means of said robot construction, in the longitudinal direction of the milking parlour relative to a reference plane situated transversely to said longitudinal direction, in which reference plane the centre of gravity of the relevant animal is located.

12 Claims, 5 Drawing Sheets

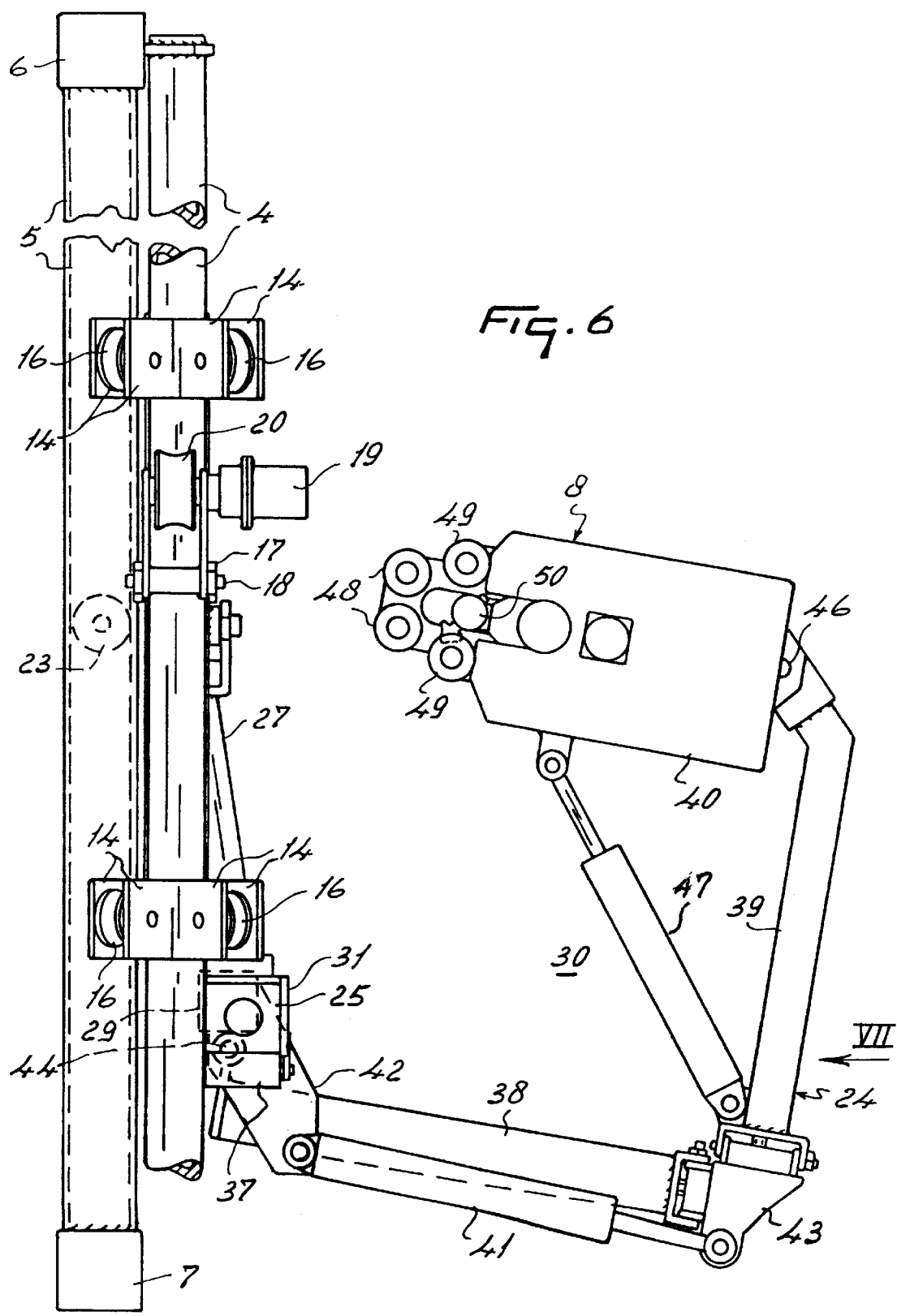

METHOD OF POSITIONING MEANS FOR AUTOMATICALLY MILKING ANIMALS, SUCH AS COWS, AS WELL AS AN IMPLEMENT FOR APPLYING SAME

FIELD OF THE INVENTION

The present invention relates to a method of positioning, by means of a robot apparatus, means for automatically milking animals, such as cows. More particularly, the invention relates to an apparatus and method for detecting the approximate location of the udder of an animal to be milked in a milking compartment antecedent to precisely ascertaining the positions of the animal's udder and teats and automatically emplacing teat cups on the teats.

BACKGROUND OF THE INVENTION

As disclosed in European Patent Application 0 519 544, a plate urged against the rear side of the animal serves as a reference plane, while, by means of a sensor attached to the robot apparatus, its position relative to the plate, and consequently relative to the animal, is determined.

SUMMARY OF THE INVENTION

An object of the instant invention is to provide a method of positioning the robotic milking apparatus which eliminates the use of a plate that is urged against an animal's rear side. For such purpose, according to the invention, the method is characterized in that the means for automatically milking the animal are positioned in the longitudinal direction of the milking parlor relative to a reference plane which extends transversely in respect to said longitudinal direction, in which reference plane the center of gravity of the relevant animal is located. In particular, this method is furthermore characterized in that, in the milking parlor, the pressures and positions exerted on the floor by at least one foreleg and one hindleg of the animal are determined and recorded in a computer wherein based on such data, the reference plane is defined. Making use of the pressure exerted by the animal on the floor of the milking parlor and the places on the floor where this pressure is exerted, for the purpose of obtaining position data for automatically milking animals, is known per se from European Patent Application 0 572 068. Therein, the data are used for determining the position of the udder and/or the teats of the animal, so that, by means of the robot apparatus, the means for automatically milking can be positioned under the under of the animal to be milked. However, a reference plane through the animal's center of gravity is not suggested, albeit, also when the animal moves, the means for automatically milking can be positioned relative to this plane and be maintained in this position. Although the means for automatically milking may be first moved to a position relative to the reference plane, that is fixed for all the animals, and, if required, may thereafter be accurately positioned under the animal's teats, it is also possible to record in the computer, for individual animals, the position of the udder and/or the teats relative to the reference plane. In the latter case, it is desirable initially to record in the computer the position of the udder and/or the teats of an animal relative to the reference plane after the teat cups have been connected to the teats of the animal and thereafter for that animal to use this data for positioning the automatic milking means.

As soon as an animal moves in the milking parlor, in particular makes a step forwardly or rearwardly, or when the animal, while staying with its legs on the same place, moves more forwardly or rearwardly, the reference plane and, consequently, the means for automatically milking moves as well. In other words: upon moving of the animal in the longitudinal direction of the milking parlor, the means for automatically milking can be maintained in a fixed position relative to the reference plane. Although the robot apparatus may be arranged in a fixed position relative to the milking parlor, while, by means of guiding one or more arms of the robot apparatus, the position of the means for automatically milking may be maintained fixed relative to the reference plane and moved relative to the milking parlor, it is advantageous for the robot apparatus as a whole to be positioned in the longitudinal direction of the milking parlor relative to said reference plane.

When an animal has entered the milking parlor, the robot apparatus is moved from an inoperative position into a position defined relative to the reference plane, whereafter, according to the invention, the robot arm, serving as a carrier for the means for automatically milking, and constituting part of the robot apparatus, pivots under the animal from the fixed position that the robot apparatus has taken relative to the reference plane. In a particular embodiment according to the invention, there is provided on the said robot arm a detector, in particular a laser detector, while, after the detector has been brought under the animal in a position in which the teats of the animal can be detected, upon moving of the animal, the teats will be followed by post-guiding the robot arm by means of the detector, and, as long as the teats have not yet been detected or as soon as the teats are no longer detected, they will be followed by post-guiding the robot arm in the reference plane.

Besides the method, the invention also relates to a mechanism for positioning, by means of a robot apparatus, means for automatically milking animals, such as cows. Such mechanism is provided with elements that are sensitive to pressure, by means of which the pressure exerted by the animal with at least one foreleg and one hindleg on the floor of the milking parlor and the places on the floor where this pressure is exerted are determined and recorded in a computer. The computer is equipped to define, with the aid of the data it receives, a reference plane situated transversely to the longitudinal direction of the milking parlor, in which reference plane the center of gravity of the relevant animal is located, and to position the means for automatically milking in the longitudinal direction of the milking parlor relative to said reference plane. In a practical embodiments of such an mechanism, there are disposed elements sensitive to pressure in or on the floor of the milking parlor, at those places where the animal can place its hoofs. Although it is sufficient to dispose elements sensitive to pressure on the place where the animal can stand with only one hindleg and only one foreleg, it is advantageous to dispose these elements at those places where the animal can stand with all its legs. The apparatus according to the invention is additionally provided with an animal identification system cooperating with the computer, while, for each animal, there is recorded in the computer the position of the udder and/or the teats relative to the reference plane.

BRIEF DESCRIPTION OF THE DRAWINGS

For a better understanding of the invention and to show how the same may be carried into effect, reference will now be made, by way of example, to the accompanying drawings, in which:

FIGS. 3 to 8 are detailed views of various parts of the apparatus shown in FIGS. 1 and 2.

DESCRIPTION OF THE PREFERRED EMBODIMENT

Figure 1:
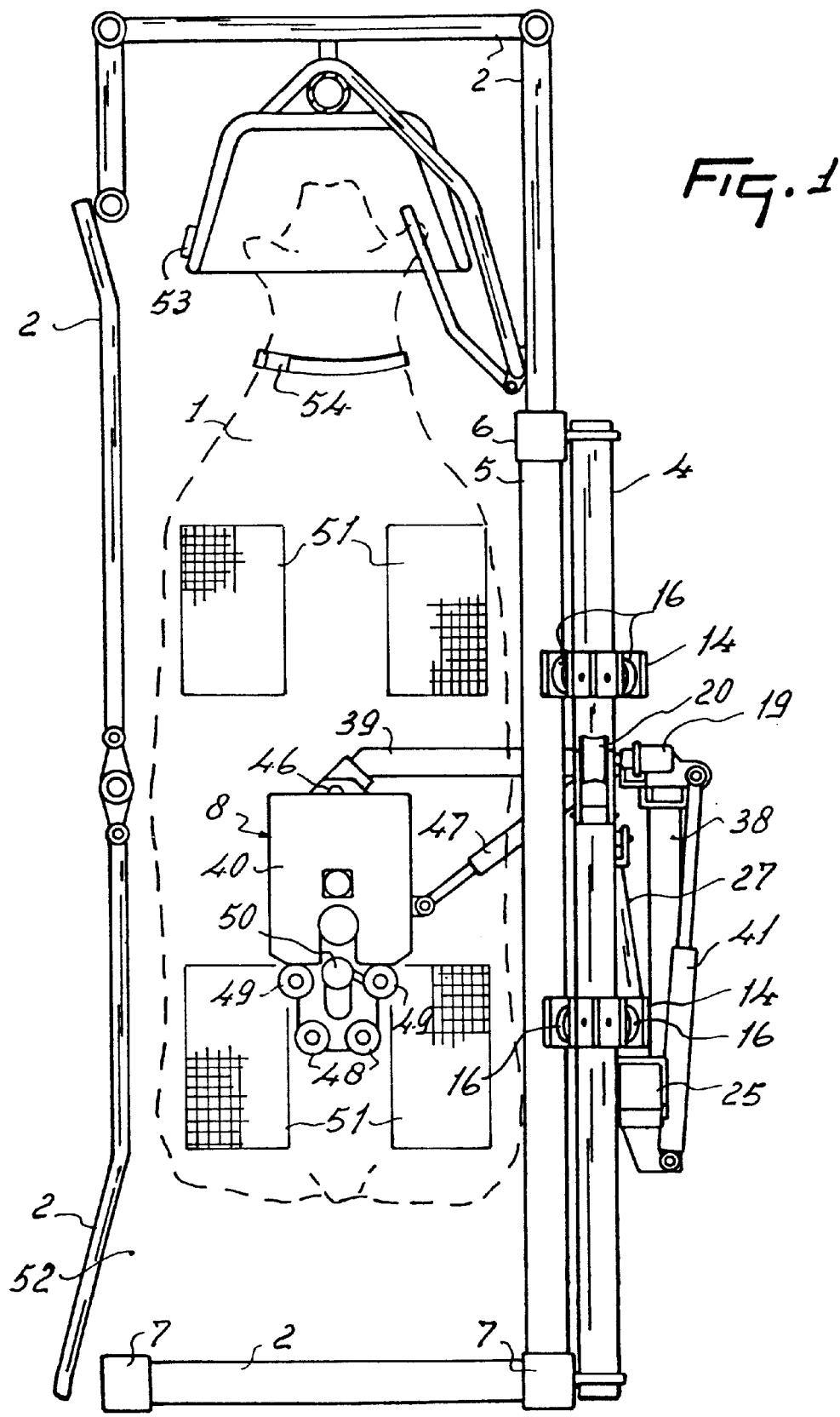
FIG. 1 shows, in plan view, a milking apparatus according to the invention, in which arms of the milking robot are positioned under an animal present in the milking parlor.
Figure 2:
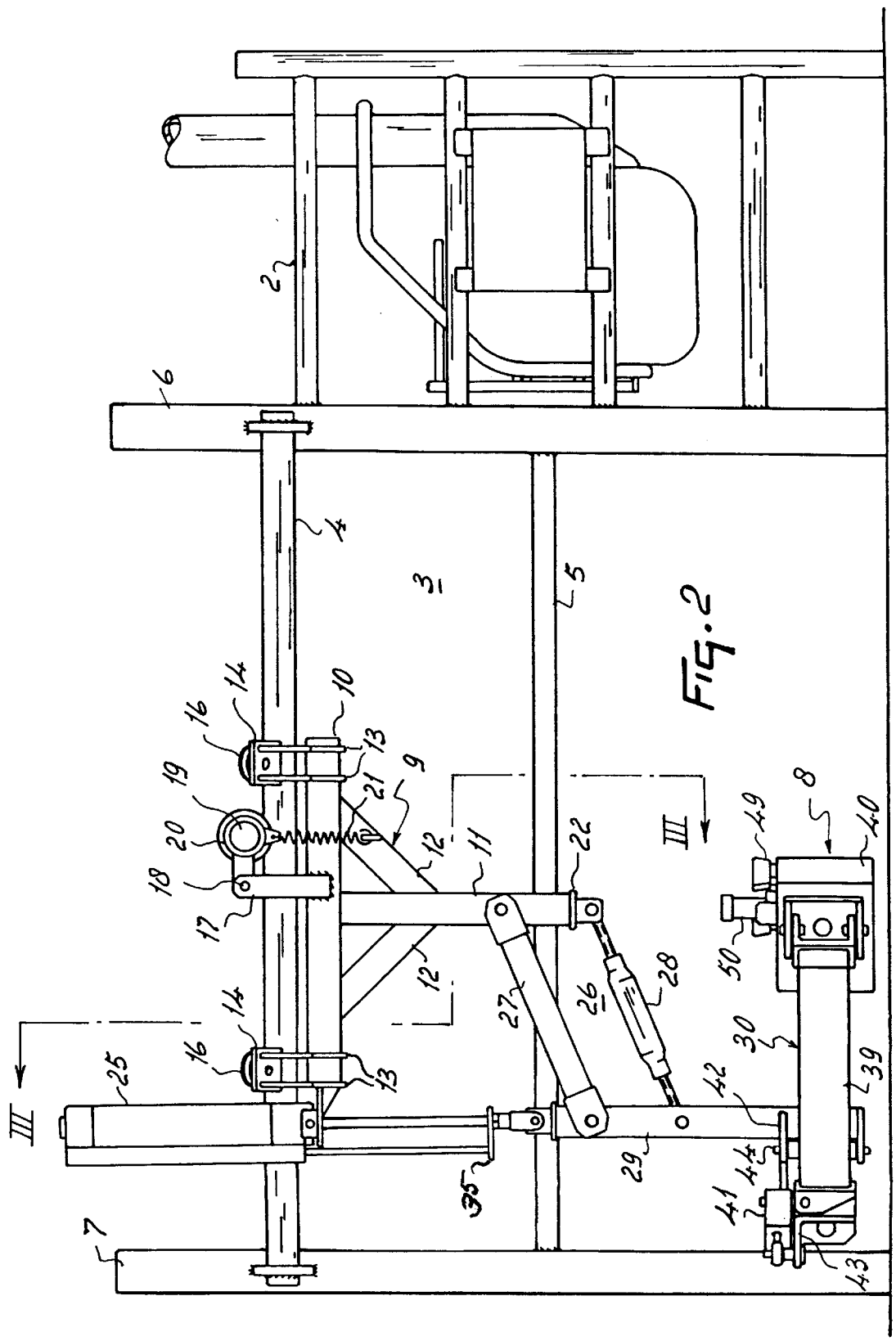
FIG. 2 is a side elevational view of the milking apparatus shown in FIG. 1, in which the milking robot is in the inoperative position.
Figure 3:
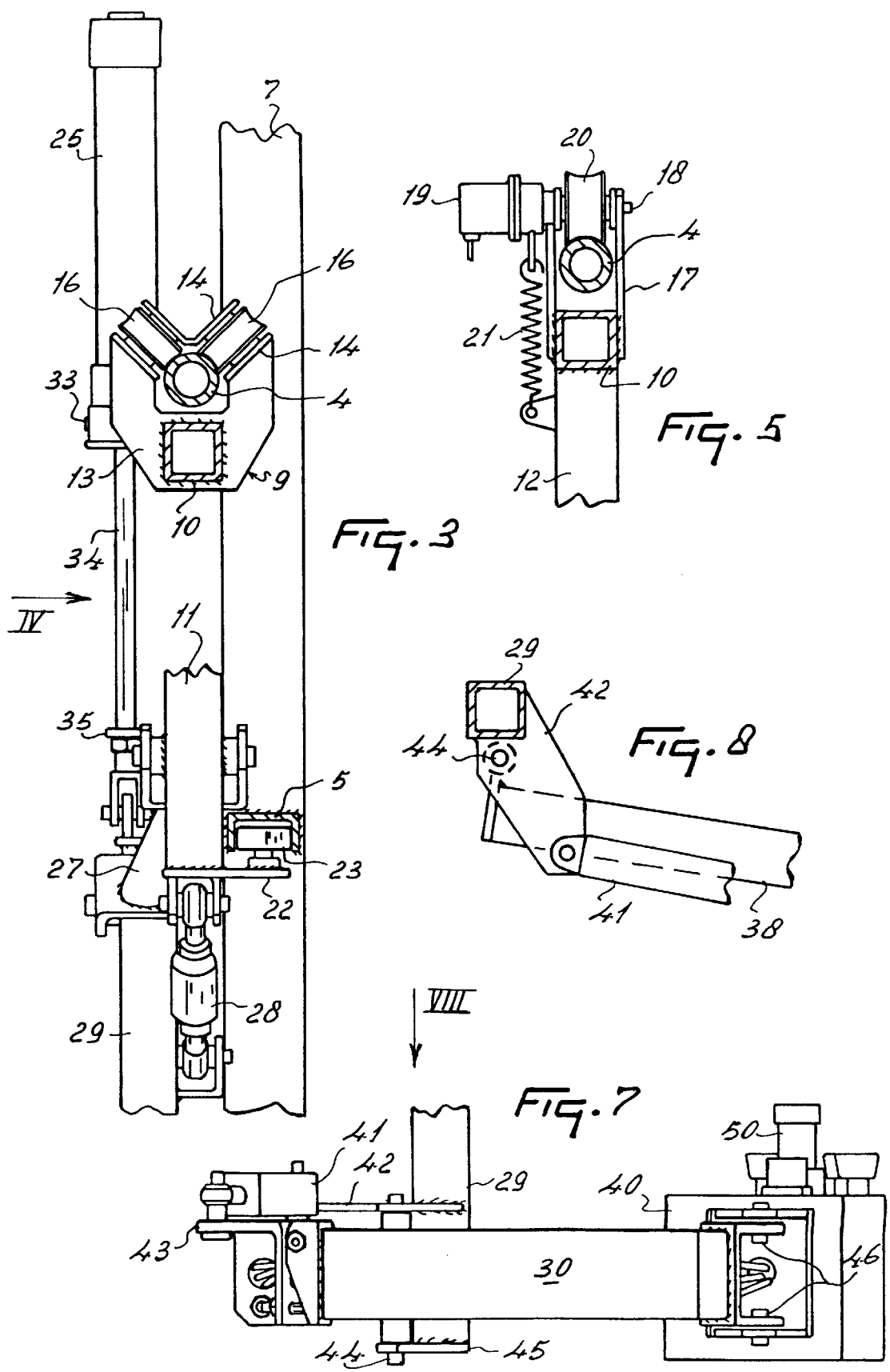
Figure 4:
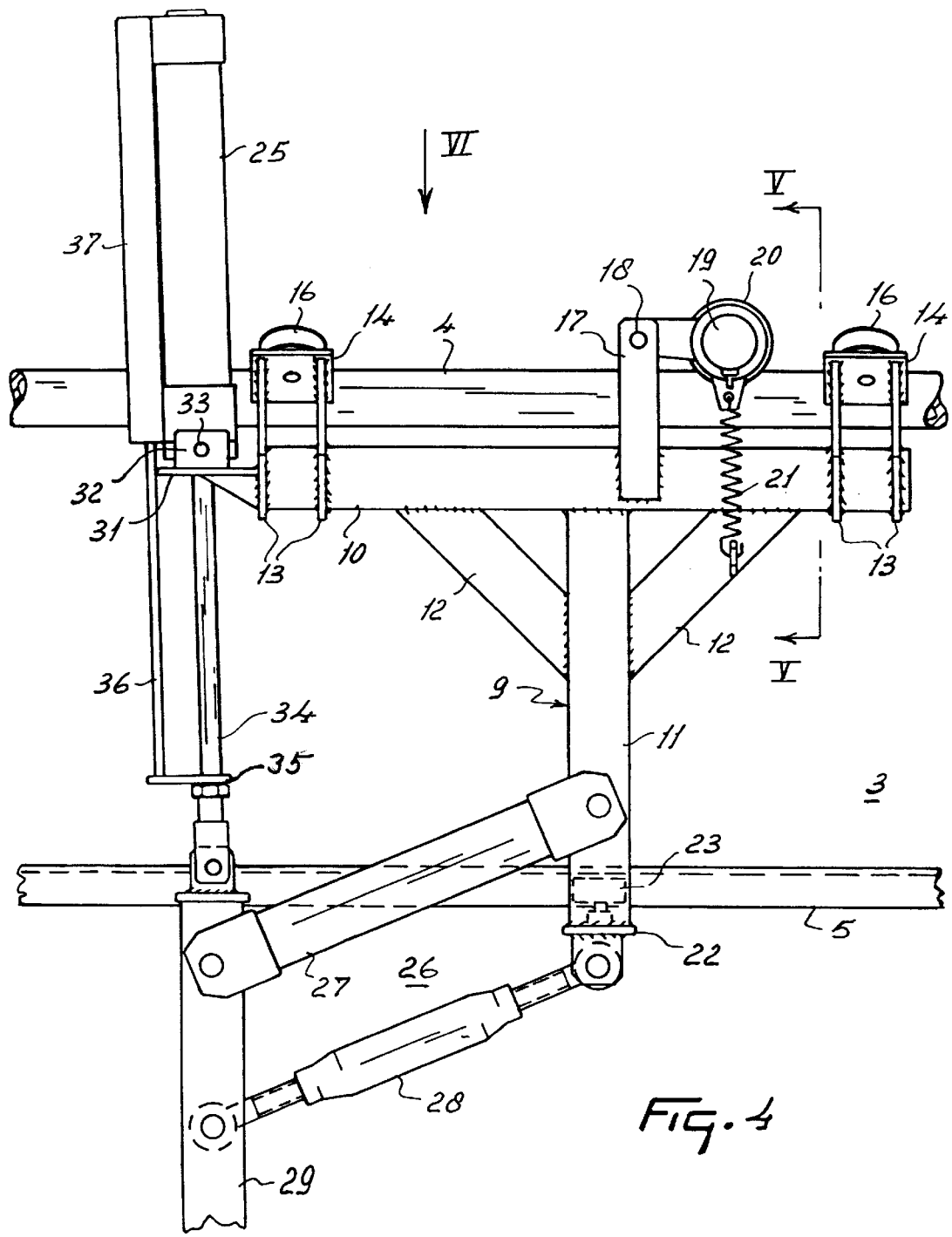

In the plan view of the milking apparatus shown in FIG. 1, there is represented a cow 1 depicted in dashed lines which is present in the milking parlor, surrounded by a framework 2 allowing the animal a limited freedom of movement. The animal enters the milking parlor via a longitudinal side near the rear thereof and leaves same via the same longitudinal side near the front thereof. The front side of the milking parlor being provided with a feeding installation, the cow advances sufficiently into the parlor to a position in which it can be milked easily. At the other longitudinal side of the milking parlor, being opposite to the one including the entrance, and exit, there is provided a fixed frame 3 constituting part of framework 2, which frame 3 includes a first frame part 4 and a second frame part 5. First frame part 4 extends parallel to second frame part 5 and is situated substantially thereabove. First frame part 4 is fixed to the outside of two vertical stands 6 and 7 constituting part of framework 2, while second frame part 5 is fixed therebetween. To first frame part 4, there is movably attached a milking robot 8 for automatically milking animals, while this milking robot is supported against second frame part 5 disposed at such a height that the arms of milking robot 8 are movable therebelow under the cow present in the milking parlor. Milking robot 8 comprises a carrier frame 9 for its further parts. By designing upper frame part 4 as a rail, carrier frame 9, and consequently the entire milking robot 8, can easily be moved along this frame part. Carrier frame 9 includes a beam 10 extending substantially parallel to first frame part 4, a beam 11 directed vertically downwardly perpendicular to beam 10 and fixed thereto, and two struts 12. Near the ends of beam 10, there are provided pairs of supporting elements 13. To each pair of supporting elements 13, by means of supporting plates 14 fixed thereto, at an angle of approximately 45°, there are provided two rollers 16, in such a way that the carrier frame 9 is suspended easily movably along upper frame part 4, therebelow. On the beam 10 of carrier frame 9, on both sides, there are provided two carriers 17, to which there is attached, movably about a pivot shaft 18, a motor 19. By this motor 19 there is driven a roller 20, preferably having a rubber surface, which roller is urged against upper frame part 4 by means of a spring member 21. Spring member 21 being connected between motor 19 and carrier frame 9, roller 20 driven by the motor 19 is continually pressed against upper frame part 4, so that, when the motor is driven, it is moved along upper frame part 4 and, consequently, the entire carrier frame 9 is so moved. By means of a computer (not shown), it is possible to guide the milking robot, in the longitudinal direction of the milking parlor, from an inoperative position to a starting position, in which the milking robot arms are moved under the animal present in the milking parlor, and to follow the movements of the animal in the longitudinal direction thereof. For that purpose, there is defined in the computer, as will be described, a reference plane which is disposed transversely to the longitudinal direction of the milking parlor and through the center of gravity of the animal. By means of the computer and motor 19 controlled by the same, milking robot 8 can be moved in the longitudinal direction of the milking parlor so that the distance between the reference plane and the milking robot is attained and then maintained, at an adjusted value. In its inoperative position, milking robot 8 is moved rearwardly as far as possible relative to frame parts 4 and 5. Upon a forward or backward movement of the cow, the position of the reference plane moves to correspond to that of the animal in the milking parlor in the longitudinal direction thereof, so that, while maintaining the distance in longitudinal direction between the reference plane and the milking robot 8, the latter follows the movements of the cow in the longitudinal direction of the milking parlor. In the present embodiment, beam 11 of carrier frame 9 extends vertically downwardly to somewhat below second frame part 5. At the lower side of this beam 11, there is disposed a horizontal, rearwardly extending strip 22 which is provided with a freely rotatable roller element 23. Lower frame part 5 is constituted by a rail, in particular one designed as a U-shaped beam, while freely rotatable roller element 23 is arranged in such a way that it is movable between the two upright edges of the U-shaped beam. In this manner, milking robot 8 is supported against lower frame part 5 and, when being moved by means of the motor over first frame part 4, it can easily move along second frame part 5. Besides carrier frame 9, the milking robot comprises a robot construction 24 which, by means of a control cylinder/piston combination 25, is movable substantially vertically relative to carrier frame 9. By means of a quadrangle construction 26, robot construction 24 is movably connected with carrier frame 9. In the embodiment shown, the upper arm 27 of this quadrangle construction 26 has a fixed length, while the lower arm 28 thereof is adjustable in length so as to enable robot construction 24 to be adjusted to a limited extent. Robot construction 24 comprises a substantially vertical robot arm 29 as well as robot arms 30 that are movable in a substantially horizontal plane. By means of the quadrangle construction 26, robot arm 29 is connected with beam 11 of the carrier frame 9. Control cylinder/piston combination 25 is active between carrier frame 9 and robot arm 29. As, by means of lower arm 28 of the quadrangle construction 26, the orientation of robot arm 29 is slightly adjustable, the spatial position of the action point of control cylinder/piston combination 25 at robot arm 29 is not entirely fixed. For that reason, the housing of control cylinder/piston combination 25 is provided, at least pivotably to a limited extent, on a carrier plate 31 attached to beam 10 of carrier frame 9. On this carrier plate 31 there are disposed supports 32, wherebetween the housing of control cylinder/piston combination 25 is capable of being moved about a pivot shaft 33. In the present embodiment, the control cylinder/piston combination is designed as a servo-pneumatic positioning cylinder/piston combination. This means that, at the lower end of piston rod 34, by means of a plate 35 fixed thereto, there is attached a position feedback rod 36, by means of which, in a part 37 of the control cylinder/piston combination, a potentiometer deduces a signal indicating the position of the piston rod relative to the cylinder housing, while, with the aid of the signal supplied by the potentiometer, the position of piston rod 34 relative to the cylinder housing can be post-guided to a preset position. Furthermore, control cylinder/piston combination 25 is provided with an overload protection enabling robot construction 24 to be moved into its lowest position, as soon as the animal present in the milking parlor exercises a pressure thereon, e.g. by kicking. FIGS. 2 and 4 show milking robot 8 in its operative position, in which it has been moved as rearwardly as possible and the robot construction 24 has been brought nearest possible to the underlying floor. When a cow is present in the milking parlor and the milking process is to be started, milking robot 8 is brought from its inoperative position into the starting position, i.e. into the position wherein the arms of milking robot 8 can be moved to under the cow.

In the present embodiment, for that purpose, the milking robot includes arms 38, 39 and 40. The arms 38 and 39 are arranged at a fixed angle of 90° relative to each other. Therefore, arms 38 and 39 are moved together, i.e. by a control cylinder/piston combination 41 provided between a supporting plate 42 attached to robot arm 29 and a connecting piece 43 disposed between the two arms 38 and 39. The two latter arms are pivotable about a substantially vertical pivot shaft 44 between the supporting plate 42 and a supporting plate 45, which latter plate is also rigidly connected to robot arm 29, more in particular at the lower end thereof. Arm 40 is pivotable relative to arm 39 about a substantially vertical pivot shaft 46 and pivots relative thereto by means of a control cylinder/piston combination 47 disposed between arm 40 and the end of arm 39 that is situated near connecting piece 43. Near the end of arm 40, there are provided the teat cups 48 and 49 to be connected to the teats of the cow. Between the two teat cups 49 there is disposed a slide, which is movable on arm 40 and on which there is provided a sensor 50 which, by a sectorwise scanning movement, can accurately determine the position of the teats, so that the control cylinders/piston combinations 25, 41 and 47 can be computer-controlled in such a way that the teat cups will be connected properly to the teats. Robot arms 38, 39 and 40 having been brought to under the cow, they are in a relatively low position, in which sensor 50 will not yet detect teats. By means of the control cylinder/piston combination 25, robot arms 38, 39 and 40 are raised stepwise until sensor 50 detects one or more teats of the animal.

The apparatus as shown in FIG. 1 furthermore comprises elements 51 sensitive to pressure which, in the present embodiment, are disposed in the floor 52 of the milking parlor. In particular, elements 51 sensitive to pressure are disposed in a lowered part of floor 52, so that they are situated at the same level therewith. It will be obvious, however, that elements 51 sensitive to pressure may also be arranged on floor 52 of the milking parlor.

Elements 51 sensitive to pressure may be constituted by piezo-elements known per se. In the embodiment shown in FIG. 1, the elements sensitive to pressure are disposed at four places in floor 52 of the milking parlor. The places where elements 51 sensitive to pressure are disposed are selected so that, when an animal enters the milking parlor, it stands with its legs on all four elements sensitive to pressure. The elements 51 sensitive to pressure may also be built up by a number of juxtaposed pressure cells, which may be designed as electro-mechanic contacts, as is detailed in European Patent Application 0 572 068.

The apparatus according to the invention is additionally provided with an animal identification system being in communication with the computer of the milking robot. The animal identification system is constituted by a sensor 53 arranged near the feeding trough and being in communication with the computer and a transponder 54 disposed around the neck of the cow 1.

The function of the above-described apparatus is as follows:

When a cow enters the milking parlor, sensor 53 receives from transponder 54 a code that is unique for the relevant cow. With the aid of said code, the computer connected with sensor 53 defines which cow has occupied the milking parlor. In the computer (not shown), all the known data relating to the animal are retrieved and kept on stand by. After the cow has entered the milking parlor, elements 51 sensitive to pressure are activated due to the fact that the cow has put its legs on said elements 51. The surface of elements 51 sensitive to pressure being many times larger than that of the undersides (hoofs) of the cow's legs, only some pressure cells are pressed. The pressure cells pressed by the animal's legs supply a signal to the computer, with the aid of which the position of the cow's legs on the floor 52 of the milking parlor are exactly defined. For that purpose the position of each pressure cell is recorded in the memory of the computer. With the aid of the pressure cells, the pressure exerted by the animal's legs is then determined. On the basis of the latter information and the places where this pressure is exerted, there can be defined in the computer the position of a reference plane in the longitudinal direction of the milking parlor that extends through the center of gravity of the animal. When the animal moves, the reference plane moves as well. Furthermore, for each animal, there is recorded in the memory of the computer the position of the udder and/or the teats relative to said reference plane. The position of the reference plane having been determined with the aid of the signals supplied by the elements 51 sensitive to pressure, the position of the udder and/or the teats relative to the reference plane for the relevant animal is read out of the memory of the computer. On the basis of the coordinates read out, teat cups 48 and 49 are guided, by means of robot construction 24 relative to the reference plane, first arms 38, 39, 40 pivot under the cow. As soon as robot arm 40 has been brought in the longitudinal direction under the cow in such a way that detector 50 detects the teats thereof, by means of detector 50, said robot arm 40, when the cow moves, is post-guided to the teats by pivoting about the shaft 46, and by moving the entire robot construction 24 in the longitudinal direction of the milking parlor. When the teats remain within the range of the detector, it is possible to determine their position and to guide robot arm 40 whereby the teat cups 48 and 49 can be connected. As long as the teats are not detected by the detector, or when the animal moves so that the detector no longer detects the teats, then robot arm 40 is post-guided in the longitudinal direction in the reference plane, whereafter the teats will again have come within the range of the detector. Due to the fact that, for each animal, the position of the udder and/or the teats relative to the reference plane is to known, it will always be possible, when robot arm 40 has been post-guided in the longitudinal direction to the correct position relative to the reference plane, to make the teats fall within the range of the detector.

The invention is not restricted to the embodiment shown, but also relates to all details of the drawings, whether described or not, and to all modifications within the scope of the following claims.

Having disclosed my invention, what I claim as new and to be secured by Letters Patent of the United States is:

1. A method of positioning, by means of a robotic mechanism including means for automatically milking animals, such as cows, comprising a milking parlor including a floor, said floor comprising elements that are sensitive to pressure, signal receiving means operatively connected to said elements that continually provides signals on where and how much pressure is exerted on said elements by at least one foreleg and one hindleg of the animal in the milking parlor to determine a transverse reference plane that coincides with the center of gravity of the animal in said milking parlor to be milked and continuously positioning the means for automatically milking in the longitudinal direction of said milking parlor relative to said reference plane.

2. A method as claimed in claim 1, further comprising obtaining data of the pressure exerted by the animal, whereby this pressure is exerted, and recording said data in a computer, the determination of said reference plane being made with the aid of said data.

3. A method as claimed in claim 2 comprising further recording for each individual animal to enter said milking parlor the position of said animal's udder or teats or both relative to the reference plane in the computer.

4. A method as claimed in claim 3, wherein said recorded position of each animal's udder or teats or both of said animal relative to the reference plane is their actual position which is recorded after connecting teat cups which are included in said means for automatically milking animals to the teats of the corresponding animal.

5. A method as claimed in claim 2 which further comprises maintaining the means for automatically milking in a fixed position relative to the reference plane in response to the animal's movements in the milking parlor.

6. A method as claimed in claim 1, wherein said robotic mechanism comprises a robot apparatus, the method further comprising, the positioning said robot apparatus as a whole in the longitudinal direction of the milking parlor relative to said reference plane.

7. A method as claimed in claim 6, wherein said robot apparatus comprises said robot arm that serves as a carrier for the means for automatically milking, said robot arm pivoting under the animal in respect to the position of said robot mechanism to the reference plane in the parlor.

8. A method as claimed in claim 7, wherein a laser detector is provided on the robot arm comprising moving said detector under the animal in the parlor into a position in which the teats of the animal can be detected, and upon the moving of the animal, following said teats by post-guiding the robot arm by means of the detector.

9. A method as claimed in claim 7, wherein a laser detector is mounted on said robot arm, further comprising moving said detector to a position wherein it can detect the teats of the animal by post-guiding said robot arm in relation to said reference plane.

10. A mechanism for positioning, by means of a milking robot, means for automatically milking animals, such as cows, comprising a milking parlor including a floor, said floor comprising elements that are sensitive to pressure, signal receiving means operatively connected to said elements that continually provides signals on where and how much pressure is exerted on said elements by at least one foreleg and one hindleg of an animal in the milking parlor to define a reference plane disposed transversely to the longitudinal direction of the milking parlor, in which said reference plane containing the center of gravity of the relevant animal, the position of said reference plane continuously being determined by signals received by said signal receiving means, said milking robot positioning said means for automatically milking with the aid of said reference plane.

11. A mechanism as claimed in claim 10, wherein said elements are disposed at those places where an animal to be milked in said parlor is likely to put its legs.

12. A mechanism as claimed in claim 10, comprising an animal identification system in said parlor, and recorded data operatively associated with said animal identification system that provides the location of the teats and/or udder for each animal that has been milked in said parlor relative to said reference plane.

\* \* \* \* \*